US010588387B1

(12) United States Patent
Lee et al.

(10) Patent No.: US 10,588,387 B1
(45) Date of Patent: Mar. 17, 2020

(54) WALKING CANE WITH ENHANCED SECURITY FEATURES AND VIDEO RECORDING CAPABILITY

(71) Applicants: Don W Lee, Glendale, CA (US); Sung Lee Fortney, Glendale, CA (US)

(72) Inventors: Don W Lee, Glendale, CA (US); Sung Lee Fortney, Glendale, CA (US)

(*) Notice: Subject to any disclaimer, the term of this patent is extended or adjusted under 35 U.S.C. 154(b) by 0 days.

(21) Appl. No.: 16/417,378

(22) Filed: May 20, 2019

(51) Int. Cl.
*A45B 3/04* (2006.01)
*A45B 3/14* (2006.01)
*A45B 9/02* (2006.01)
*H04N 5/225* (2006.01)
*A45B 9/00* (2006.01)

(52) U.S. Cl.
CPC ............... *A45B 3/04* (2013.01); *A45B 3/14* (2013.01); *A45B 9/02* (2013.01); *H04N 5/2252* (2013.01); *H04N 5/2256* (2013.01); *A45B 2009/002* (2013.01); *A45B 2200/05* (2013.01)

(58) Field of Classification Search
None
See application file for complete search history.

(56) References Cited

U.S. PATENT DOCUMENTS

| 5,056,545 | A | | 10/1991 | Spaeth | |
|---|---|---|---|---|---|
| 5,588,735 | A | * | 12/1996 | Harada | A45B 3/00 135/910 |
| 5,839,461 | A | * | 11/1998 | Lambeth, Jr. | A45B 3/00 135/72 |
| 5,901,723 | A | | 5/1999 | Ames | |
| 6,745,786 | B1 | * | 6/2004 | Davis | A45B 3/00 135/65 |
| 6,933,855 | B2 | | 8/2005 | Preston | |
| 6,957,750 | B1 | * | 10/2005 | Trudell | A45B 3/14 135/66 |
| 7,654,275 | B2 | * | 2/2010 | Ewell | A45B 3/00 135/66 |
| 8,627,839 | B1 | * | 1/2014 | Martinez | A45B 3/00 135/66 |
| 9,226,555 | B1 | * | 1/2016 | Shyu | A45B 3/04 |
| 10,492,577 | B2 | * | 12/2019 | Ritter | A45B 9/02 |
| 2008/0072940 | A1 | * | 3/2008 | Cheng | A45B 3/00 135/66 |
| 2009/0038664 | A1 | * | 2/2009 | Juslin | A45B 3/00 135/66 |
| 2009/0199884 | A1 | * | 8/2009 | Lessing | A45B 3/00 135/66 |

* cited by examiner

*Primary Examiner* — Noah Chandler Hawk
(74) *Attorney, Agent, or Firm* — Plager Schack LLP; Mark H. Plager; Eric Liou

(57) ABSTRACT

A walking cane with enhanced security features designed for use by a user to facilitate walking on a ground surface is provided. The walking cane includes a housing having a tubular member with a front face, a rear face and a pair of side faces, a handle coupled to the rear face of the housing, and a camera disposed within the internal cavity of the housing and having a lens that protrudes out the front face of the tubular member. The handle is grasped by the user to facilitate walking on the ground surface while the camera activates to simultaneously generate video of the surrounding area of the cane for a later retrieval.

10 Claims, 4 Drawing Sheets

WALKING CANE WITH ENHANCED SECURITY FEATURES AND VIDEO RECORDING CAPABILITY

BACKGROUND

The embodiments herein relate generally to walking canes. More specifically, embodiments of the invention are directed to a walking cane with enhanced safety and security features.

Canes are beneficial for assisting users when walking on the ground. In particular, the walking cane serves as a mobility aid that enhances user support and balance by redistributing weight from any of the user's legs. As such, these canes are particularly beneficial for elderly individuals or other individuals who suffered an injury that inhibits their ability to walk independently.

Safety and security are areas of concern for users of these walking canes, particularly elderly individuals. Elderly individuals have to be careful to avoid potential tripping hazards when walking. In addition, elderly individuals have to protect themselves from theft or violent crimes since they are often victims of these crimes due to their inability to defend themselves.

Several walking canes exist as disclosed in U.S. Pat. Nos. 6,933,855, 5,901,723 and 5,056,545, which disclose canes or sticks having various safety features such as a lamp, alarm and pepper spray components. However, these canes and sticks are limited because they are bulky and/or difficult to maneuver or operate. In addition, these canes and sticks do not provide the capability to capture images or video of the surrounding area of the cane, which provides the user peace of mind by having the ability to document any evidence of a crime or safety hazard leading to a fall.

As such, there is a need in the industry for a walking cane with enhanced safety and security that addresses the limitations of the prior art, which provides the user the capability to generate video of the surrounding area of the cane when in use for a retrieval at a later time. There is a further need for the walking cane to provide an easy to use device that is compact and easily stored.

SUMMARY

In certain embodiments of the invention, a walking cane with enhanced security features configured for use by a user to facilitate walking on a ground surface is provided. The walking cane comprises a housing comprising a tubular member with a front face, a rear face and a pair of side faces connecting the front and rear faces together, the front, rear and pair of side faces forming an internal cavity, a handle coupled to the rear face of the housing, the handle comprising a first longitudinal axis that is oriented generally perpendicular to a second longitudinal axis of the tubular member of the housing, and a camera disposed within the internal cavity of the housing and comprising a lens that protrudes out the front face of the tubular member, the camera configured to record video of a surrounding area of the cane, wherein the handle is configured to be grasped by the user to facilitate walking on the ground surface while the camera activates to simultaneously generate video of the surrounding area of the cane for a later retrieval to perform an action.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
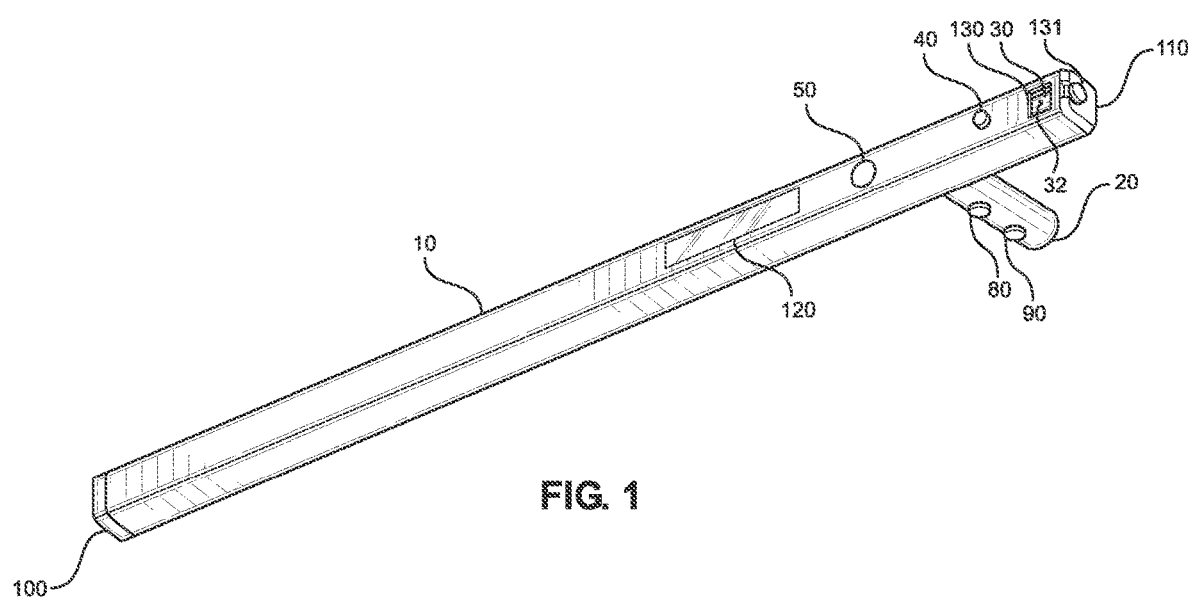
FIG. 1 depicts a perspective view of certain embodiments of the walking cane.

In certain embodiments of the invention as depicted in FIGS. 1-4, the walking cane is configured to provide support and assistance to a user when walking. The walking cane is advantageous because it provides an easy to use and compact device with a plurality of safety and security features as will be described herein. In certain embodiments, the walking cane generally comprises housing 10, handle 20, pepper spray canister 30, camera 40, alarm speaker 50 and LED module 60.

Figure 2:
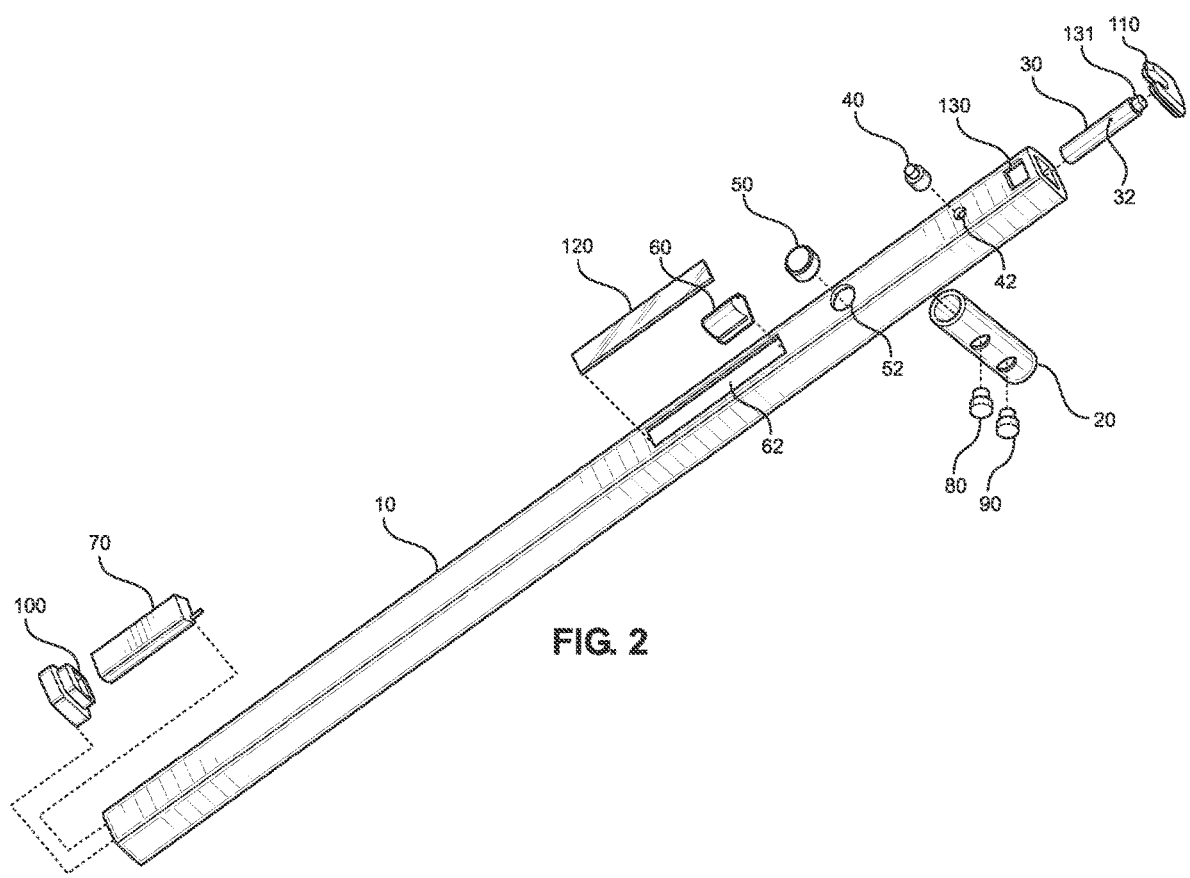
FIG. 2 depicts an exploded view of certain embodiments of the walking cane.
Figure 3:
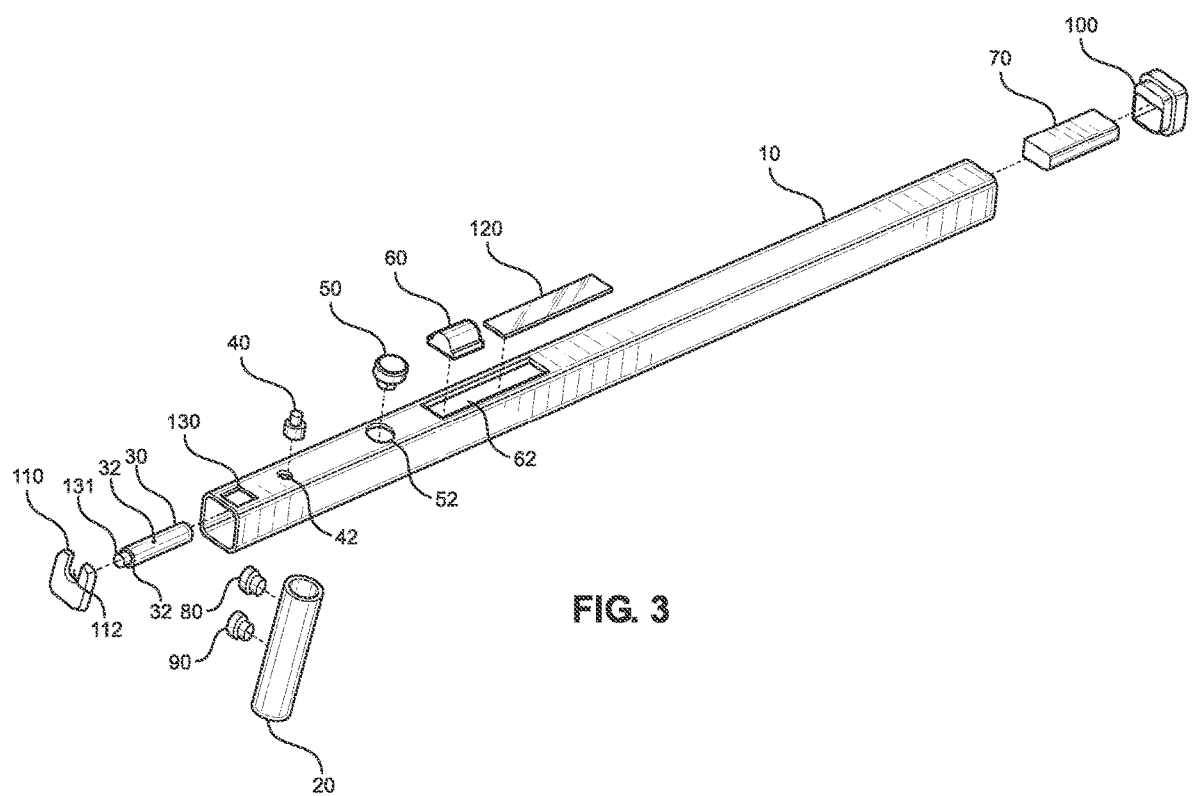
FIG. 3 depicts an exploded view of certain embodiments of the walking cane.

In certain embodiments, housing 10 preferably comprises a tubular member with a square cross-section. The tubular member comprises a front face, a rear face and a pair of side faces connecting the front and rear faces together. In certain embodiments as depicted in FIGS. 2-3, the front face of the tubular member of housing 10 comprises camera opening 42, alarm speaker opening 52, light opening 62 and pepper spray opening 130. The size and shape of each opening in camera opening 42, alarm speaker opening 52, light opening 62 and pepper spray opening 130 can vary to accommodate the particular component present therein. Housing 10 is preferably made from plastic. However, alternative materials can be used instead. In an alternative embodiment, it shall be appreciated that the tubular member of housing 10 can have variable shapes.

In one embodiment as depicted in FIGS. 1-4, foot 100 is coupled to the bottom end of the tubular member of housing 10. Foot 100 is configured to contact the ground when the walking cane is used. In a preferred embodiment, foot 100 is made from rubber or another material that is sufficiently durable to provide the walking cane enhanced support, stability and grip when contacting the ground.

Figure 4:
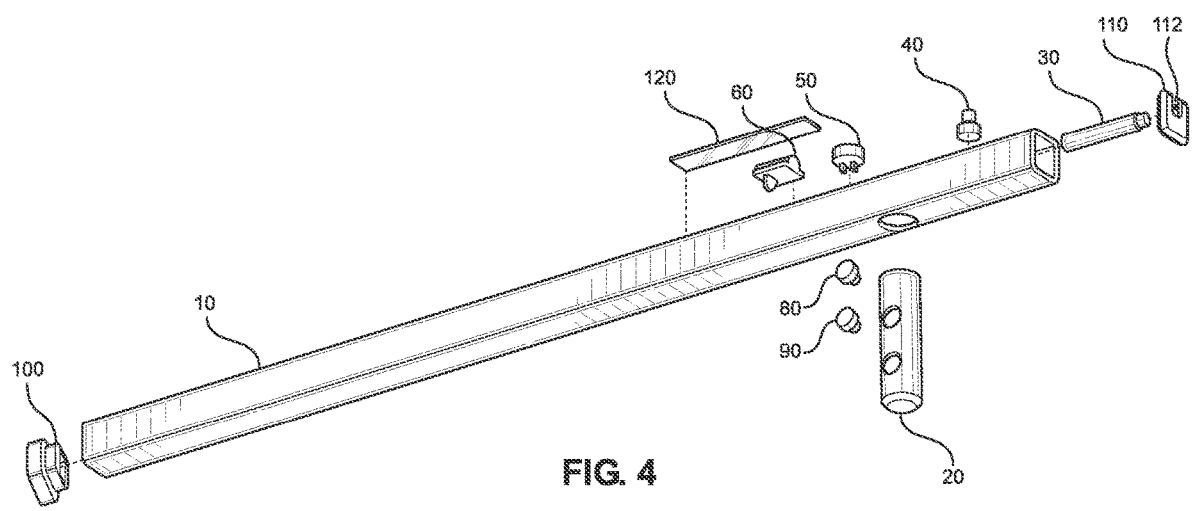
FIG. 4 depicts an exploded view of certain embodiments of the walking cane.

In one embodiment, lid 110 is detachably coupled to the top end of the tubular member of housing 10. Lid 110 is preferably made from plastic or a similar-type material, and is configured to attach and detach from the tubular member of housing 10 as needed. In one embodiment as depicted in FIGS. 3-4, lid 110 comprises cutout 112 to help facilitate the operation of pepper spray canister 30 as will be described in embodiments of the invention. The tubular member of housing 10, foot 100 and lid 110 together form an internal cavity that houses the components of the invention including pepper spray canister 30, camera 40, alarm speaker 50 and LED module 60.

In certain embodiments as depicted in FIGS. 1-4, pepper spray canister 30 is secured within the internal cavity of housing 10 proximate the top end of the tubular member. Pepper spray canister 30 is configured to store pepper spray and comprises nozzle 32 and button 131. Button 131 is operably connected to a pump mechanism. Depressing button 131 allows the pump mechanism to dispense pepper spray out nozzle 32 of pepper spray canister 30.

As depicted in FIG. 1, nozzle 32 of pepper spray canister 30 is aligned with pepper spray opening 130 in housing 10.

This allows pepper spray dispensed from nozzle 32 of pepper spray canister 30 to flow through pepper spray opening 130 in housing 10 to the surrounding area of the walking cane. Button 131 of pepper spray canister 30 extends through cutout 112 in lid 110. This allows the user to easily control the operation of pepper spray canister 30 without removing lid 110 from housing 10. The user can remove lid 110 from housing 10 to replace a depleted pepper spray canister 30 with a new canister.

In certain embodiments as depicted in FIGS. 2-4, LED module 60 is secured within the internal cavity of housing 10 by an adhesive, mechanical fasteners or other fastening components. LED module 60 comprises any number of LED bulbs directed to light opening 62, which is covered by window 10. Window 10 is a transparent material made from plastic or glass, which allows light generated from LED module 60 to pass through and project to the surrounding area of the walking cane. In an alternative embodiment, LED module 60 can be replaced by any alternate illuminating devices known in the field.

In certain embodiments as depicted in FIGS. 1-4, alarm speaker 50 is secured within the internal cavity of housing 10 by an adhesive, mechanical fasteners or other fastening components. Alarm speaker 50 is aligned with speaker opening 52 on the front face of the tubular member of housing 10. This allows alarm speaker 50 to generate an audible alert that projects through speaker opening 52 in housing 10 to the surrounding area of the walking cane. In certain embodiments, alarm speaker 50 can generate an intermittent or continuous audible alert that can be programmed as desired. In one embodiment, alarm speaker 50 has a volume adjuster to vary the sound level of the audible alert.

In certain embodiments as depicted in FIGS. 1-4, camera 40 is secured within the internal cavity of housing 10 by an adhesive, mechanical fasteners or other fastening components. Camera 40 comprises a lens that protrudes through camera opening 42 to a position outside the front face of housing 10. In an alternative embodiment, the lens of camera 40 can be flush with camera opening 42 of housing 10 or recessed within the internal cavity of housing 10.

In one embodiment, camera 40 comprises any type of camera capable of recording image and/or video data for a retrieval in real-time or at a later time. Since the lens of camera 40 is aligned with camera opening 42 in housing 10, camera 40 captures image and/or video data of the surrounding area of the walking cane. In certain embodiments, camera 40 is programmed as desired to enable a variety of modes such as a continuous operation, programmed operation for a specified time interval, or manual operation via one or more switches (not shown). The generated image and/or video data can be transmitted via a wired or wireless connection over a network to a local computing device, remote device, smart phone, tablet and the like. It shall be appreciated that any software application can be used in conjunction with camera 40 to retrieve, playback and/or analyze the recorded image and/or video data.

In one embodiment as depicted in FIGS. 2-3, battery 70 is secured within the internal cavity of housing 10 using any fastening components, mounting brackets, and the like. Battery 70 is electrically coupled by wiring to camera 40, alarm speaker 50, LED module 60 and any other electrical components housed within the walking cane. In one embodiment, battery 70 is a LiPo battery. However, it shall be appreciated that any alternative type of battery or power source can be used instead. In certain embodiments, it shall be appreciated that any additional electrical components such as one or more printed circuit boards (PCB) can be housed within the walking cane and electrically coupled to camera 40, alarm speaker 50, LED module 60 or other components to facilitate the operation of these components.

In certain embodiments as depicted in FIGS. 1 and 4, handle 20 is coupled to the rear face of the tubular member of housing 10. In a preferred embodiment, handle 20 comprises a longitudinal axis that is oriented perpendicular to the longitudinal axis of housing 10. In one embodiment, handle 20 is connected to housing 10 via a snap-fit connection. However, an adhesive, mechanical fasteners or other fastening components can be used to secure handle 20 to housing 10. In one embodiment, handle 20 is preferably made from plastic. However, handle 20 can be made from alternative materials. In one embodiment, handle 20 comprises an outer grip layer made from rubber, silicone or other materials. Although the figures depict handle 20 as having a cylindrical shape, it shall be appreciated that handle 20 can have variable shapes and sizes.

In certain embodiments, alarm switch 80 and LED module switch 90 are coupled to handle 20. Alarm switch 80 is electrically coupled to alarm speaker 50 by wiring that extends within the interior of handle 20 and housing 10. Similarly, LED module switch 90 is electrically coupled to LED module 60 by wiring that extends within the interior of handle 20 and housing 10. Alarm switch 80 is adjusted to switch alarm speaker 50 to the ON and OFF positions. Similarly, LED module switch 90 is adjusted to switch LED module 60 to the ON and OFF positions.

In certain embodiments, alarm switch 80 and LED module switch 90 can be positioned along any portion of handle 20 to avoid inadvertent contact with the user's hands. In one embodiment, a pair of covers is pivotably mounted or detachably coupled to alarm switch 80 and LED module switch 90. Each cover is positioned to enclose the corresponding switch or adjusted and/or removed to expose the corresponding switch.

In operation, the user grabs handle 20 to maneuver the walking cane for assistance when walking. The user presses LED module switch 90 to activate LED module 60 to illuminate the surrounding area of the walking cane. This improves safety by making any tripping hazards in the vicinity more visible and alerting oncoming vehicles and individuals of the user's presence. The user presses alarm switch 80 to activate alarm speaker 50 when necessary to attract the attention of others during an attack or crime. Video camera 40 generates image and/or video data of the surrounding area of the walking cane. This is particularly useful for capturing evidence of a fall associated with a tripping hazard, a theft or other crime. This image and/or video data can be retrieved for use in future litigation as needed.

It shall be appreciated that the components of the walking cane described in several embodiments herein may comprise any alternative known materials in the field and be of any color, size and/or dimensions. It shall be appreciated that the components of the walking cane described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A walking cane with enhanced security features configured for use by a user to facilitate walking on a ground surface, the walking cane comprising:
   a housing comprising a tubular member with a front face, a rear face and a pair of side faces connecting the front and rear faces together, the front, rear and pair of side faces forming an internal cavity;
   a handle coupled to the rear face of the housing, the handle comprising a first longitudinal axis that is oriented generally perpendicular to a second longitudinal axis of the tubular member of the housing; and
   a camera disposed within the internal cavity of the housing and comprising a lens that protrudes out the front face of the tubular member, the camera configured to record video of a surrounding area of the cane;
   wherein the handle is configured to be grasped by the user to facilitate walking on the ground surface while the camera activates to simultaneously generate video of the surrounding area of the cane for a later retrieval to perform an action.

2. The walking cane of claim 1, further comprising a foot coupled to a bottom end of the tubular member and a lid detachably coupled to a top end of the tubular member, the lid comprising a cutout.

3. The walking cane of claim 2, wherein the tubular member comprises an opening on the front face of the housing proximate the top end of the tubular member.

4. The walking cane of claim 3, further comprising a pepper spray canister secured within the internal cavity of the tubular member and comprising a nozzle aligned with the opening in the tubular member, the pepper spray canister configured to dispense pepper spray out the nozzle and through the opening in the tubular member to the surrounding area of the cane.

5. The walking cane of claim 4, wherein the pepper spray canister comprises a button that extends through the cutout in the lid to a position outside of the housing, wherein depression of the button allows the pepper spray canister to dispense the pepper spray.

6. The walking cane of claim 5, further comprising a window coupled to the front face of the housing and an illuminating device coupled to the tubular member within the internal cavity beneath the window, the illuminating device configured to activate to project light through the window to the surrounding area of the cane.

7. The walking cane of claim 6, further comprising a first switch coupled to the handle and electrically coupled to the illuminating device, the first switch configured to adjust the illuminating device to an ON position or an OFF position.

8. The walking cane of claim 7, further comprising an alarm speaker coupled to the housing within the internal cavity and positioned on the front face of the tubular member, the alarm speaker configured to generate an audible alert that projects to the surrounding area of the cane.

9. The walking cane of claim 8, further comprising a second switch coupled to the handle and electrically coupled to the alarm speaker, the second switch configured to adjust the alarm speaker to an ON position or an OFF position.

10. The walking cane of claim 9, further comprising a battery disposed within the tubular member of the housing and electrically coupled to the illuminating device, alarm speaker and camera.

* * * * *